Patented June 16, 1942

2,286,910

UNITED STATES PATENT OFFICE 2,286,910

TITANIUM PIGMENT AND PROCESS FOR PRODUCING THE SAME

Marion L. Hanahan and Robert M. McKinney, Wilmington, Del., assignors to E. I. du Pont de Nemours & Company, Wilmington, Del., a corporation of Delaware No Drawing. Application July 18, 1939, Serial No. 285,136

9 Claims. (Cl. 106—300)

This invention relates to a process for producing titanium pigments of improved and special pigmentary properties. More particularly, it contemplates the production of a weather-resistant, non-chalking and non-yellowing titanium dioxide pigment.

When titanium dioxide pigments are employed in exterior paints or coating compositions, they tend to chalk and fade badly, thereby imparting poor durability characteristics to the coating film. When used in interior or white baking enamels, they discolor or yellow to an objectionable extent. With a view to remedying these difficulties, various expedients have been suggested. Among others, it has been proposed to precipitate aluminum hydroxide on titanium oxide by reacting aluminum sulfate with an alkaline agent, such as sodium carbonate. Relatively large quantities of soluble salts, e. g., sodium sulfate, are caused to be concurrently precipitated with the aluminum hydroxide, which soluble salts, due to the adsorptive character of the titanium oxide, cannot be removed even after repeated washings. The presence of these soluble salts is very objectionable since coating films containing products so treated are exceptionally poor in durability and weather resistance. Similarly, treatment of the titanium dioxide with 10% zinc oxide as an addition agent has also been proposed. This has proved unsatisfactory due to the ensuing thickening or livering of the coating composition, arising by reason of the gradual reaction of the zinc oxide with the coating vehicle. To overcome this thickening effect, the use of various oxidizing agents, such as metallic peroxides, to reduce the zinc or other oxides present, has been proposed. However, this has failed to provide the desired result, since such agents inherently induce an additional reaction effect upon the coating composition vehicles.

It has been found that the difficulties alluded to may be easily and effectively overcome. Accordingly, it is among the objects of this invention to provide a simple and economical method for treating titanium pigments, whereby no reactive, oxidizing or objectionable amounts of soluble compounds will be present in such pigments by reason of their treatment, and the resultant pigments will manifest superior tint retention, will be highly resistant towards yellowing and chalking, and will be particularly adaptable for use in high temperature baking enamels.

In its broadest adaptation, the invention comprises treating a previously calcined titanium pigment with an addition agent, such as soluble barium aluminate, whereby a small amount of aluminum becomes associated with or is precipitated on the pigment in the form of aluminum hydroxide.

In a more specific and preferred embodiment, the invention contemplates adding a soluble aluminate, particularly barium aluminate, to a water slurry of a calcined titanium oxide pigment, and subsequently precipitating hydrated aluminum oxide on the surfaces of said pigment by addition of a suitable acidifying agent, preferably aluminum sulfate.

In order that the invention may be more clearly understood, the following example is given, being merely illustrative in character and in no wise in limitation of the invention:

Example I

A barium aluminate solution was prepared by dissolving 50 pounds of the commercial reagent in the minimum amount of water and the sediment was removed by filtration. The whole of this solution was then added to 2500 gallons of a calcined pigment suspension containing 5000 pounds of $TiO_2$. The resulting suspension proved to be more alkaline than desirable for the finished pigment due to the alkalinity of the reagent and as a corrective agent, a solution of aluminum sulphate equivalent to 42 pounds of $Al_2(SO_4)_3 \cdot 18H_2O$ was added. This gave a pigment having a pH of about 7.4 and an analysis of 0.45% $Al_2O_3$ and 0.9% $BaSO_4$. This pigment when formulated into a synthetic baking enamel and tested gave a baking discoloration value of 14 as compared to a value of 8 for the untreated control. When incorporated in standard outside paints and said paints spread on test panels and dried, it was found that after a period of approximately 2½ months' outside exposure on a Florida test fence, inclined at a 45° angle facing south, no tendency towards lack of tint retention, chalking or yellowing was exhibited. On the other hand, when a comparable test was made on a paint containing a similar but untreated pigment material, chalking, yellowing and lack of tint retention became evident within two weeks' time and at the end of two months, very bad chalking and fading existed.

The superiority of the treated pigments of the present invention, and particularly when incorporated in paints, enamels, and lacquers, and exposed to weathering, will be evident from the foregoing example. The treated pigments even when tested and exposed to the elements three and four times as long as untreated pigments, will exhibit little or no tendency towards chalking or yellowing. This remarkable resistance towards weathering obviously means increased paint or other coating film durability.

The baking enamel tests referred to were obtained by grinding one gram of pigment into a two cubic centimeter volume of a synthetic vehicle of the polyhydric alcohol polybasic acid type commonly used in white baking enamels by aid of a glass muller and a glass plate. Standard pigments are likewise mulled into similar pastes and portions are put onto a tinned panel along with the sample to be graded, and the panel baked at 175° C. for 1½ hours. Two standard samples were used, being arbitrarily graded "3" and "10." The former gave very definite discoloration on baking under the selected conditions and the pigment was considered too poor for use in such formulations due to its tendency to become yellow under these conditions. The "10" standard discolored (yellowed) slightly on baking but was considered good enough for use in such enamels. By baking the enamel to be evaluated between the two made from the standard pigments a numerical grading was arrived at by an examination of the baked films. A $TiO_2$ pigment initially graded 5 can easily be improved to a value of about 13 by treating it with a small quantity of $Al_2O_3$, in accordance with the invention, the treated pigment showing on baking test not only superior color when removed from the oven, but resistance to yellowing in diffused daylight.

While specific amounts of aluminum-containing compounds have been employed in the foregoing example, such quantities are only illustrative. The amount of soluble aluminate employable is subject to wide variance, largely depending upon the amount of aluminum hydroxide $(Al(OH)_3)$ or aluminum oxide $(Al_2O_3)$ desired in the treated pigment. The amount present in the pigment will measure or control the extent of its resistance to yellowing, chalking, or tint retention. Generally, only a small amount of aluminum need be present in the aluminate solution. In no case will it be necessary to add or incorporate in the pigment more than substantially 15% of the insoluble aluminum compound. We have found that amounts ranging as low as substantially .02% of added agent will be effective, and that when the amount of added agent ranges from .02% to 2%, based on the weight of the pigment and calculated as aluminum oxide, satisfactory and effective results ensue. Other ranges may be also contemplated, as for example, an amount of agent addition of from substantially .2% to 10%, based on the weight of the pigment and calculated as aluminum oxide. However, our preferred and specific range for obtaining optimum benefits involves the employment of from 0.4% to 1% of added agent, calculated as aluminum oxide.

In adapting the invention to practice, an aqueous solution of barium aluminate may be added to a normally acid or acidified suspension or slurry of titanium pigment, intimate mixture being effected by efficient agitation through the media of mechanical stirrers or milling apparatus such as a ball mill. Preferably, incorporation of the aluminum compound in the pigment is effected by reacting equimolecular proportions of barium aluminate and aluminum sulfate in the presence of such pigment, whereby avoidance of the introduction of soluble salts into said pigment is had. Unless the pH of the mixed solutions is not sufficient to effect precipitation of the hydrate or oxide on the pigment, a suitable quantity of an acidifying agent such as a mineral or organic acid or an acid salt having an acidic reaction may be added to the mixture to induce desired precipitation. Examples of acidifying agents suitable for the purpose include sulfuric acid, hydrochloric acid, acetic acid, and such acidic salts as aluminum chloride or aluminum sulfate. The use of the latter type of agents, i. e., aluminum chloride and aluminum sulfate, will be particularly effective and preferable since they afford the precipitation of a maximum amount of aluminum oxide or hydrate on the pigment with minimum amounts of soluble salts. While it will be found preferable to carry out the neutralization to a pH of around 7, it is to be understood that pH ranges of from substantially 5 to 8 will prove operable. Upon completion of desired milling and hydrate or oxide precipitation, the titanium pigment is then removed from the supernatant liquid, and then washed and dried in any conventional manner.

While the invention has been described with particular application to the treatment of pure titanium dioxide pigments, the treatment of other types of titanium pigments is also contemplated. Accordingly, the term "titanium pigments," as employed herein and in the appended claims, includes not only titanium dioxide pigments, but those containing extenders, such as calcium sulfate, barium sulfate, or silicates, as well as the metal titanates, particularly those of magnesium, barium, zinc, etc.

From the foregoing it will be seen that the invention provides a novel process for producing an improved titanium pigment which is highly resistant to chalking and yellowing and which exhibits excellent tint retention, even after prolonged exposure to the elements. In accordance therewith, a pigment free of oxidizing agents is obtained, since none are introduced therein as a result of treatment. Furthermore, the use of a suitable acidifying agent in effecting precipitation of the aluminum hydrate or oxide, avoids any possibility of a slowly reactive compound being formed, the presence of which in the pigment would cause coating compositions containing the same to thicken or liver. Additionally, no objectionable soluble salts, such as sodium sulfate, are formed in situ of the pigment, and none are thereby introduced into the pigment. This is very important since the presence of such salts would adversely affect the durability qualities of paints and coating compositions containing such pigment, particularly those to be used in exterior applications. Due to the adsorptive nature of the pigment, soluble salts cannot be completely removed therefrom by washing or other known treatments. However, if present in amounts up to substantially .25%, such salts will not result in serious impairment of pigmentary properties. Such minor amount is relatively negligible and will usually be present in the pigment by reason of normal processing as an impurity from materials employed in pigment production. In accordance with the present invention, therefore, the treated pigment will be substantially free of soluble salts, i. e., containing less than approximately .25% and will be of a character such as to allow maximum film durability when incorporated in outside paints or coating compositions.

The present application is a continuation-in-part of our co-pending application Serial No. 138,582, filed April 23, 1937.

We claim as our invention:

1. A method for producing a stable, weather-resistant titanium pigment containing substantially no reactive or oxidizing agents and less than substantially .25% of soluble salts comprising intimately mixing a calcined titanium pigment with an aqueous solution of barium aluminate and precipitating a small amount of aluminum hydroxide and an insoluble barium compound upon the suspended pigment by adding to said suspension aluminum sulfate and separating and recovering the so-treated pigment.

2. A method for producing a titanium pigment stable against chalking and discoloration containing substantially no reactive or oxidizing agents and less than substantially .25% of soluble salts, comprising intimately mixing an aqueous suspension of said pigment with a solution of barium aluminate, and precipitating a small amount of an insoluble aluminum compound from the group consisting of an oxide and hydroxide together with a small amount of insoluble barium sulfate on said pigment by acidifying the resultant solution with aluminum sulfate.

3. A method for producing a titanium oxide pigment stable against chalking and discoloration containing substantially no reactive or oxidizing agents and less than substantially .25% of soluble salts, comprising intimately mixing with an aqueous suspension of previously calcined titanium oxide pigment a solution of barium aluminate, and precipitating from about .02% to 10% of an insoluble aluminum compound from the group consisting of an oxide and hydroxide together with a small amount of insoluble barium sulfate on said pigment by acidifying the resultant solution with an equimolecular proportion of aluminum sulfate.

4. A method for producing a titanium oxide pigment stable against chalking and discoloration containing substantially no reactive or oxidizing less than substantially .25% of soluble salts, comprising intimately mixing with an aqueous suspension of previously calcined titanium oxide pigment a solution of barium aluminate, and precipitating from about .02% to 2% of an insoluble aluminum compound from the group consisting of an oxide and hydroxide together with a small amount of insoluble barium sulfate on said pigment by acidifying the resultant solution with an equimolecular proportion of aluminum sulfate.

5. A method for producing a stable, weather-resistant titanium pigment containing substantially no reactive or oxidizing agents and less than substantially .25% of soluble salts comprising mixing in the presence of an aqueous suspension of said titanium pigment a solution of barium aluminate with an equimolecular proportion of aluminum sulfate, whereby a small amount of an insoluble aluminum compound from the group consisting of an oxide and hydroxide together with a small amount of insoluble barium sulfate becomes precipitated on said pigment.

6. A method for producing a stable, weather-resistant titanium pigment containing substantially no reactive or oxidizing agents and less than substantially .25% of soluble salts, comprising mixing an aqueous solution of barium aluminate with a suspension of the calcined pigment, adjusting the pH value of the resulting mixture at from substantially 5 to 8, by incorporating an acidic, sulfate-radical-containing neutralizing agent in said mixture adapted to interact with said aluminate and precipitate on said pigment a small amount of an insoluble aluminum compound from the group consisting of an oxide and hydroxide together with a small amount of insoluble barium sulfate.

7. A method for producing a titanium oxide pigment stable against chalking and discoloration and containing substantially no reactive or oxidizing agents and less than substantially .25% of soluble salts, comprising intimately mixing with an aqueous suspension of the previously calcined pigment an aqueous solution of barium aluminate, adjusting the pH value of the resulting mixture from substantially 5 to 8, interacting an acidic sulfate radical-containing neutralizing agent with said aluminate which is adapted to precipitate on said pigment from about .02% to 10% of an insoluble aluminum compound from the group consisting of an oxide and hydroxide together with a small amount of insoluble barium sulfate.

8. A method for producing a titanium oxide pigment characterized by improved chalking and discoloration resistance and containing substantially no reactive or oxidizing agents and less than substantially .25% of soluble salts, comprising intimately mixing an aqueous solution of barium aluminate with a suspension of the previously calcined pigment, adjusting the pH value of the resulting mixture at from substantially 5 to 8 by incorporating a sufficient quantity of an acidic sulfate radical containing neutralizing agent therein adapted to react with said aluminate and precipitate on said pigment from about .02% to 2% of an insoluble aluminum compound from the group consisting of an oxide and hydroxide together with a small amount of insoluble barium sulfate.

9. A method for producing a titanium oxide pigment characterized by improved chalking and discoloration resistance and containing substantially no reactive or oxidizing agents and less than substantially .25% of soluble salts which comprises intimately mixing an aqueous solution of barium aluminate with an aqueous suspension of the previously calcined pigment, adjusting the pH of the resulting mixture at a value of 7 through incorporation in said mixture of an acidic sulfate radical-containing neutralizing agent adapted to react with said aluminate and precipitate on said pigment from substantially .4% to 1% of an insoluble aluminum compound from the group consisting of an oxide and hydroxide together with a small amount of insoluble barium sulfate.

MARION L. HANAHAN.
ROBERT M. McKINNEY.

CERTIFICATE OF CORRECTION.

Patent No. 2,286,910.  June 16, 1942.

MARION. L. HANAHAN, ET AL.

It is hereby certified that error appears in the printed specification of the above numbered patent requiring correction as follows: Page 3, first column, line 47, claim 4, before "less" insert --agents and--; and that the said Letters Patent should be read with this correction therein that the same may conform to the record of the case in the Patent Office.

Signed and sealed this 18th day of August, A. D. 1942.

(Seal)

Henry Van Arsdale,
Acting Commissioner of Patents.